United States Patent [19]
Mori et al.

[11] 4,159,084
[45] Jun. 26, 1979

[54] RETRACTOR FOR RESTRAINING WEBBINGS

[75] Inventors: Mamoru Mori, Okazaki; Eiichi Kinaga, Toyota, both of Japan

[73] Assignee: Toyota Jidosha Kogyo Kabushiki Kaisha, Toyota, Japan

[21] Appl. No.: 884,761

[22] Filed: Mar. 9, 1978

[30] Foreign Application Priority Data

Oct. 31, 1977 [JP] Japan .................. 52-130487

[51] Int. Cl.² .................. B65H 75/48; A62B 35/02
[52] U.S. Cl. ............... 242/107.1; 242/107.4 A; 280/806
[58] Field of Search ........... 242/107.1, 107.11, 107.12, 242/107.13, 107.14, 107.15, 107.2, 107.4 R–107.4 E; 297/388; 280/744–747

[56] References Cited
U.S. PATENT DOCUMENTS

| | | | |
|---|---|---|---|
| 906,045 | 12/1908 | Martin | 242/107.13 X |
| 2,814,504 | 11/1957 | Campbell et al. | 242/107.1 X |
| 3,323,829 | 6/1967 | Liem | 242/107.1 X |
| 3,549,203 | 12/1970 | Rawson | 242/107.1 X |
| 4,065,156 | 12/1977 | Tanaka et al. | 297/388 X |

Primary Examiner—Harvey C. Hornsby
Assistant Examiner—John M. Jillions
Attorney, Agent, or Firm—Koda and Androlia

[57] ABSTRACT

A retractor for restraining webbings wherein two webbings, i.e., a lap restraining webbing and a shoulder restraining webbing are wound round a single take-up shaft one over the other, and tension detecting means is provided for detecting the tension of the remaining wound-up portion of at least one of said two restraining webbings. Said tension detecting means has such a construction that when the tension of said one of the restraining webbings is lower than a predetermined value, it prevents the wind-off rotation of said take-up shaft, whereby said one of the restraining webbings, which is wound off as accompanied with the wind-out of the other restraining webbing, is prevented from being slackened and blocking up the interior of retractor.

13 Claims, 14 Drawing Figures

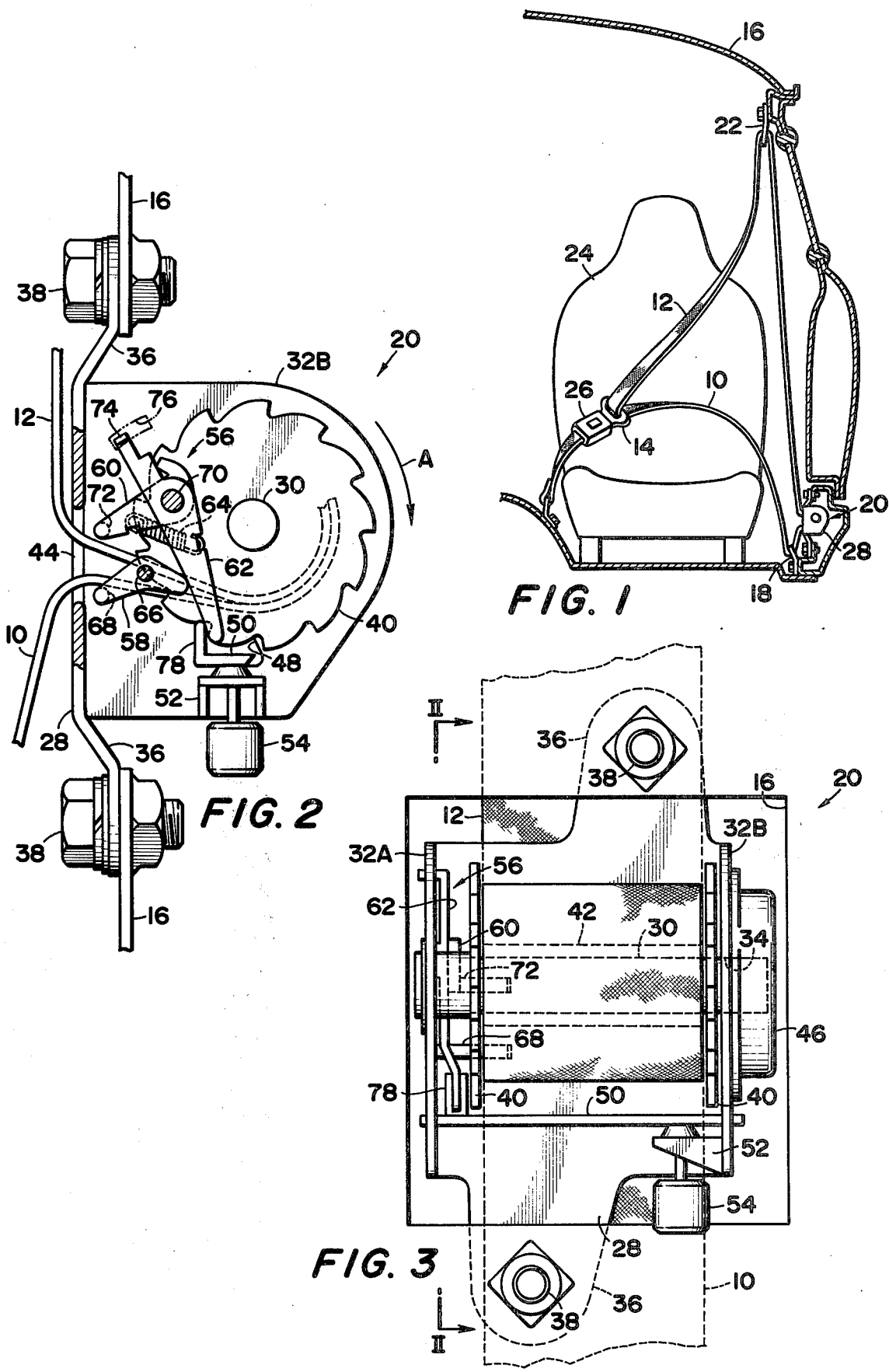

RETRACTOR FOR RESTRAINING WEBBINGS

BACKGROUND OF THE INVENTION

The present invention relates to a retractor for restraining webbings that winds therearound both lap restraining webbing and shoulder restraining webbing onto a single retractor one over the other, and in particular to a retractor for restraining webbings wherein consideration is given to preventing the restraining webbing from blocking up the interior of the retractor.

There have been proposed retractors for restraining webbings that winds both lap restraining webbing and shoulder restraining webbing into a single retractor one over the other. Since the retractor of the type described is adapted to wind the opposite end portions of the restraining webbings formed into a loop onto a single take-up shaft one over the other, a through tonque plate provided at the intermediate portion of the loop is engaged with a buckle device installed on a vehicle, whereby the operation of installing and removing restraining webbings can be simply effected, thereby enabling to obtain a retractor excellent in handling and fitness.

However, by using a double-winding type retractor, when either one of the restraining webbings, the webbing wound over the other for example, is wound off by the occupant, the restraining webbing wound inside is accompaniedly pulled out of the retractor. In contrast with this, when the restraining webbing wound inside is pulled out, the pull-out tension is not applied to the restraining webbing wound over the other, and hence, said restraining webbing is slackened and blocks up the interior of the retractor, which may be responsible for preventing the action of inertia-locking mechanism for rapidly interrupting the wind-off rotation of the restraining webbings in an emergency of the vehicle. Additionally, there may be such danger that the blocking as described above, in an extreme case, impairs the fitness of the restraining webbings since slack is caused to the restraining webbings being put on by the occupant, and reliable restraining cannot be achieved.

SUMMARY OF THE INVENTION

In view of the above, the object of the present invention is to provide a double-winding type retractor for restraining webbings wherein the webbing is not slackened and does not block up the interior of the retractor. According to the present invention, tension detecting means is provided on the remaining woundup portion of at least one of the restraining webbings doubly wound up, and the restraining webbings are prevented from being wound off when the tension of said restraining webbing is lower than a predetermined value, thereby preventing the restraining webbing from blocking up the interior of the retractor.

BRIEF DESCRIPTION OF THE DRAWINGS

FIG. 1 is a front view showing the seat belt system to which the first embodiment of the present invention is applied;

FIG. 2 is a sectional view taken along the line II—II in FIG. 3, showing the first embodiment of the present invention;

FIG. 3 is a side view of FIG. 2;

DETAILED DESCRIPTION OF A PREFERRED EMBODIMENT

Figure 4:
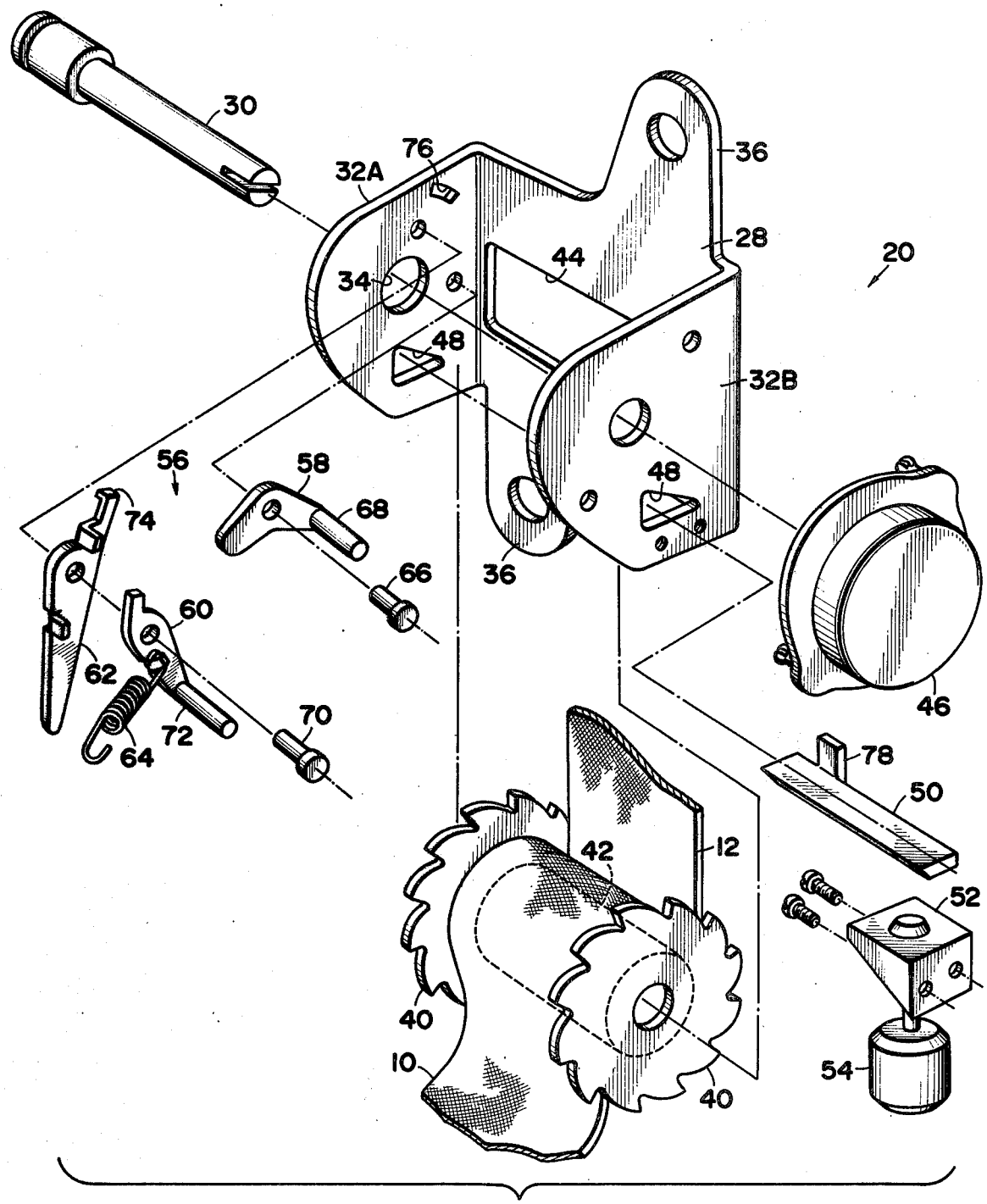
FIG. 4 is an oblique disassembled view showing the first embodiment of the present invention.

Description will hereunder be given of one embodiment of the present invention with reference to the drawings:

FIG. 1 is a front view showing the retractor for the restraining webbings according to the present invention being installed on the vehicle. A lap restraining webbing 10 and a shoulder restraining webbing 12 are connected at the ends thereof to each other, and a through tonque plate 14 is coupled onto said connection portion. Said through tonque plate 14 is slidable in the longitudinal direction of the restraining webbing when necessary. The lap restraining webbing 10 is wound up by the retractor 20 installed on a vehicle 16 after being folded back at a slip anchor 18 secured to the lower portion of the vehicle 16. While, the shoulder restraining webbing 12 is wound up by the retractor 20 in the same manner as the lap restraining webbing 10 after being folded back at a slip anchor 22 secured to the upper portion of the vehicle 16, i.e., at a position disposed in opposed relation with the slip anchor 18.

Consequently, when the occupant seated at a seat 24 engages the through tonque plate 14 with a buckle 26 erectedly provided at a substantially central portion of the vehicle, he can put on the lap restraining webbing 10 and shoulder restraining webbing 12 which are bifurcated from the retractor 20 in a suitable 3-point restraining system as shown in FIG. 1.

As shown in FIGS. 2, through 4, the lap restraining webbing 10 and the shoulder restraining webbing 12 are adapted to be wound round the take-up shaft 30 pivoted on a frame 28 one over the other.

Legs 32A, 32B projecting from the opposite side portions of the frame 28 are penetratingly provided therein with shaft holes 34 for pivotally supporting the take-up shaft 30, respectively, and projecting pieces 36 vertically projecting from the central portion of the frame 28 of the rectractor 20 are mounted on the vehicle 16 by the use of mounting bolts 38.

A winding drum 42 provided at opposite sides thereof with ratchet wheels 40 is secured to the substantially central portion of said take-up shaft 30. The restraining webbings 10, 12 to be wound round said winding drum 42 in layers is practically wound round the take-up shaft 30 since the winding drum 42 is secured to the take-up shaft 30. As shown in FIG. 2, when the restraining webbings are doubly wound round the take-up shaft 30, the lap restraining webbing 10 is adapted to be wound over the shoulder restraining webbing 12, said restraining webbings enter the room of vehicle through a rectangular window 44 formed at the substantially central portion of the frame 28.

Further, spiral spring take-up means 46 is secured to the frame 28 is connected to the take-up shaft 30 projecting from the leg 32B of the frame 28, whereby the take-up shaft 30 is urged to rotate in the direction of winding up the restraining webbings. Consequently, if the occupant pulls the restraining webbing, then the take-up shaft 30 is rotated in the direction of the wind-off rotation of the restraining webbing, i.e., the direction indicated by an arrow A against the urging force of rotation. Hence, the length of the remaining wound-up portion of the restraining webbings which is not to be wound round the take-up shaft 30, i.e., the length of the restraining webbings put on by the occupant may be desirably changed.

Additionally, said frame 28 is penetratingly provided at the legs 32A, 32B thereof with triangular windows 48 identical in shape with each other. A plate-shaped pawl 50 is spanned between said triangular windows 28 and oscillatingly movable. In normal condition, said pawl 50 is horizontal by its gravity and slightly spaced apart from the ratchet wheel 40 secured to the take-up shaft 30. Furthermore, a sensor 54, a pendulum, is hung from the leg 32B of the frame 28 through a bracket 52. Said horizontal pawl 50 is disposed on said pendulum 54.

Consequently, in case the vehicle is in an emergency such as a collision, inclining said pendulum 54, the pawl 50 is inclined to engage the ratchet wheel 40, whereby the take-up shaft 30 is prevented from being rotated for winding off the restraining webbings, thereby reliably restraining the occupant.

Next, the frame 28 is provided at the leg 32A thereof with tension detecting means 56 which comprises detecting arms 58, 60, a rocking arm 62 and a tensile coil spring 64.

Said detecting arm 58 is pivoted on the leg 32A by means of a pin 66. A detecting bar 68 extending from one end of said detecting arm 58 in parallel to the take-up shaft 30 is adapted to abut against the lap restraining webbing 10. The other end of said detecting arm 58 is adapted to abut against the rocking arm 62. The detecting arm 60 is provided on the leg 32A by means of pin 70. A detecting bar 72 extending from one end of said detecting arm 60 in parallel to the detecting bar 68 is adapted to abut against the shoulder restraining webbing 12. Furthermore, the rocking arm 62 is pivoted together with the detecting arm 60 on the leg 32A by means of the pin 70. A tensile coil spring 64 is spanned between the rocking arm 62 and the detecting arm 60 so as to keep a certain angle made between the detecting arm 60 and the rocking arm 62 at a predetermined value of urging force. Additionally, one end of the rocking arm 62 is formed into a right-angledly bent stopper 74 which is inserted into a slot 76 formed in the leg 32A so as to define the oscillating angle of the rocking arm to lower than a predetermined value. The other end of the rocking arm 62 is adapted to abut against a force receiving piece 78 right-angledly bent from a portion of said pawl 50.

Figure 5:
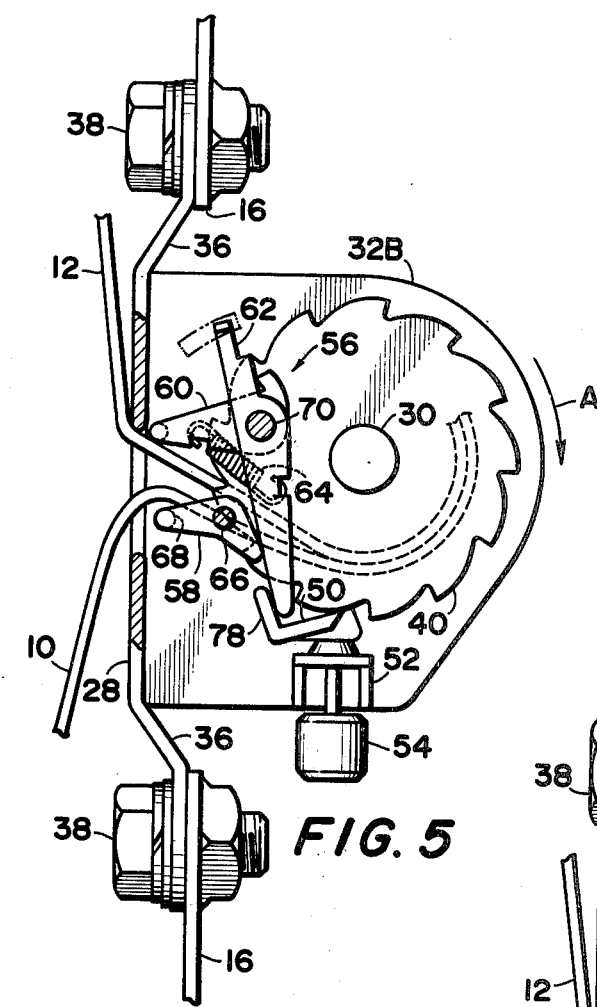
FIG. 5 is a sectional view showing the state where the tension is applied only to the shoulder restraining webbing in FIG. 2.

With the detecting arm 60, when the tension of the unwound portion of the shoulder restraining webbing 12 is intensified as shown in FIG. 5 the detecting bar 72 is rotated on the pin 70 in the clockwise direction, and hence, the tensile coil spring 64 rotates the rocking arm 62 also in the clockwise direction by the urging force thereof, inclining the pawl 50 through the force receiving piece 78 to be engaged with the ratchet wheel 40. Furthermore, with the detecting arm 58, when the tension of the lap restraining webbing 10 is elevated higher than a predetermined value, the detecting bar 68 rotates the detecting arm 58 on the pin 66 in the counter-clockwise direction, oscillating the rocking arm 62 on the pin 70 against the urging force of the tensile coil spring 64 to transmit the action to rocking arm 62 so that the pawl 50 can be horizontal.

Description will hereunder be given of the action of the present embodiment as arranged above. FIG. 2 shows the state where the occupant does not put on the restraining webbings. In this case, no tension is applied on the remaining wound-up portions of both restraining webbings 10, 12 by the occupant and the detecting bars 68, 72 are separated from or in light contact with said restraining webbings, respectively, and hence, the rocking arm 62 does not transmit the force to the pawl 50.

If the occupant grips the tonque plate 14 shown in FIG. 1 and engage the same with a buckle 26 in order to put on the restraining webbings, then he can assume the state of putting on the restraining webbings. However, if the movement of the tonque plate 14 is effected in such a manner that the tension is applied on the shoulder restraining webbing only as shown in FIG. 5, then the lap restraining webbing 10 which have been wound over said shoulder restraining webbing 12 is also wound off as accompanied with the wind-off of the shoulder restraining webbing 12. The lap restraining webbing 10 wound off as accompanied with the wind-off of the shoulder restraining webbing 12 may be slackened in the frame 28, wound round the pawl 50 and so on, thus causing troubles.

However, in the case described above, the detecting arm 60 detects the tension of the unwound portion of the shoulder restraining webbing 12 as shown in FIG. 5 and the rocking arm 62 inclines the pawl 50, whereby the pawl 50 is engaged with the ratchet wheel 40, thereby interrupting the wind-off rotation of the ratchet wheel.

Figure 6:
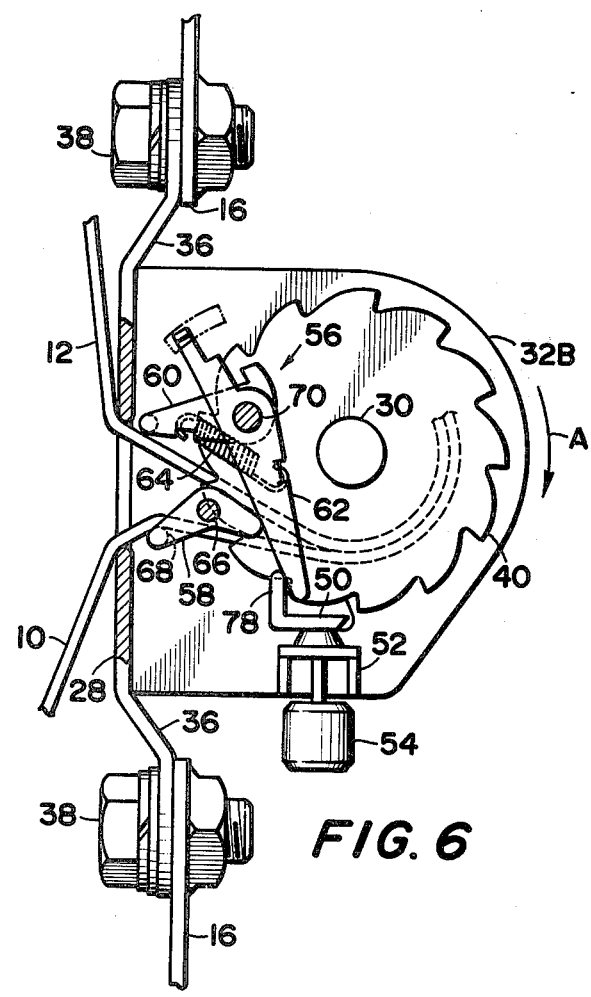
FIG. 6 is a sectional view showing the state where the tensions are applied to both restraining webbings in FIG. 2.

Furthermore, in the case the occupant applies the wind-out force to the restraining webbings in a condition where the uniform tensions are applied to the both restraining webbings 10, 12 and in the case the occupant applies the wind-off force to the restraining webbing at the inner side, the detecting arm 58 is rotated on the pin 66 in counter-clockwise direction as shown in FIG. 6, so that the rocking arm 62 can be oscillated on the pin 70 in counter-clockwise direction against the urging force of the tensile coil spring 64 to return the pawl 50 to the horizontal state, whereby the ratchet wheel 40 and the take-up shaft 30 are not prevented from rotating in an unwinding direction, thereby enabling the occupant to freely change both restraining webbings.

Since it becomes possible for the occupants to wind off both restraining webbings only when the tension applied to both restraining webbings is as described above, the restraining webbing wound off as accompanied by the other one is not slackened and does not block up the interior of the frame 28, and does not interrupt the proper action of the pawl 50 which is the wind-off stopping mechanism in an emergency of the vehicle.

Additionally, in the above action, description has been given only to the state in the case of moving the tonque plate when the occupant wants to put on the restraining webbings. Also, in the case the occupant wants to move his upper body forwardly after he has put on the restraining webbings, the same action as above is performed, and the restraining webbing does not block up the interior of the frame 28. Further, in the above embodiment, the lengths of the both restraining webbings are adjusted, so that slight tensions may be applied to the both restraining webbings in the state where the occupant does not put on the restraining webbings as shown in FIG. 6.

Figure 7:
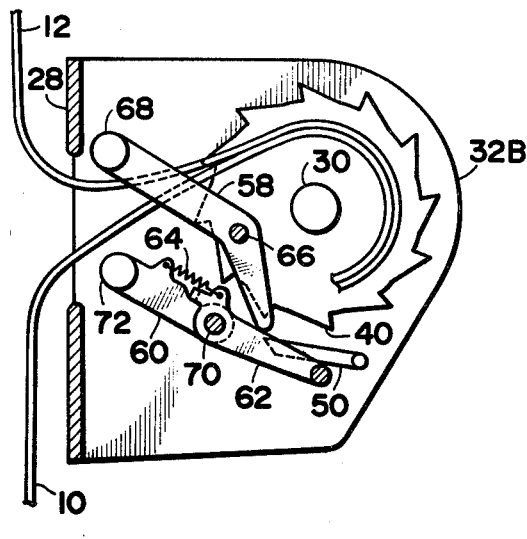
FIG. 7 is a sectional view showing the second embodiment of the present invention.
Figure 8:
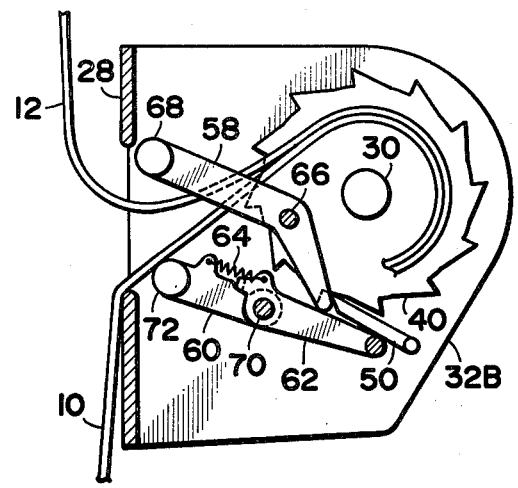
FIG. 8 is a sectional view showing the state where the tension is applied only to the lap restraining webbing in FIG. 7.
Figure 9:
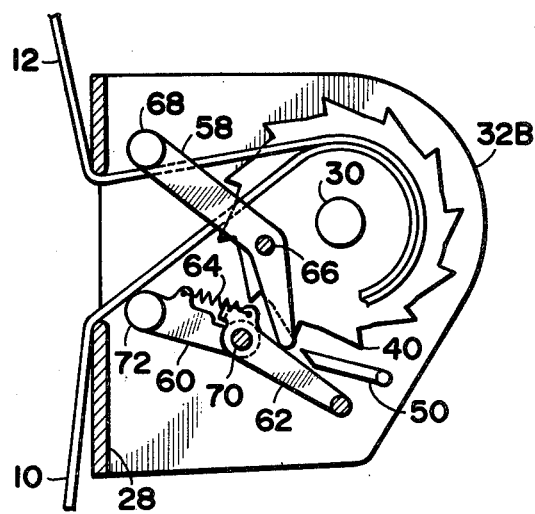
FIG. 9 is a sectional view showing the state where the tensions are applied to both restraining webbings in FIG. 7.

Next, FIGS. 7 through 9 show a second embodiment of the present invention, in which the shoulder restraining webbing 12 is wound round the take-up shaft 30 over the lap restraining webbing 10. This leads to that the detecting arm 58 is adapted to abut against the shoulder restraining webbing 12, and the detecting arm 60 is adapted to abut against the lap restraining webbing 10. The second embodiment is similar to the first embodiment except that the edge of the ratchet wheel 40 is directed opposite to the case of the first embodiment and adapted to effect the action similar thereto. In addition, FIG. 7 corresponds to FIG. 2 of the first embodiment, and FIG. 8 to FIG. 5 thereof, respectively. Additonally, in the second embodiment, the rocking arm 62 abuts at the end portion thereof against the lower portion of the pawl 50, and is adapted to directly incline the pawl 50 not through the power receiving piece 78 unlike the first embodiment.

Figure 10:
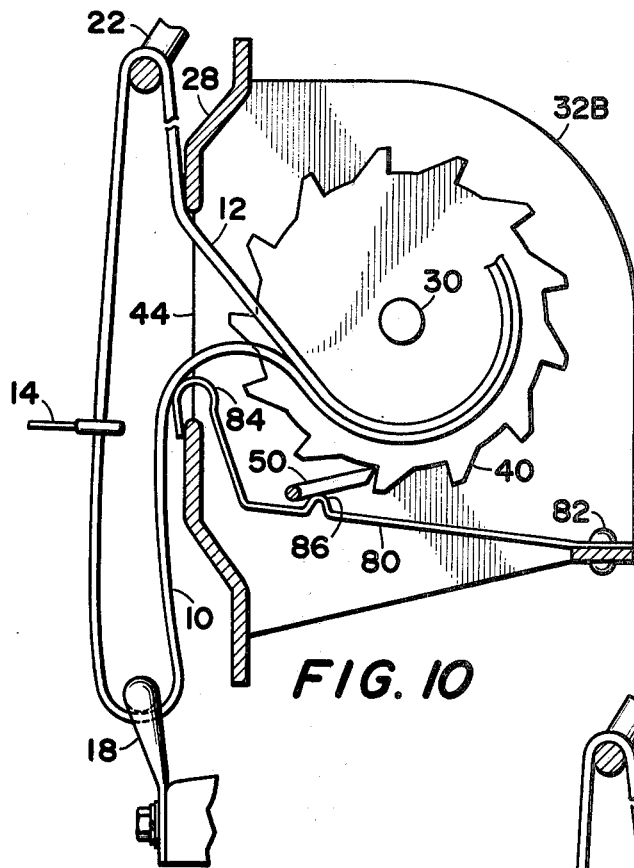
FIG. 10 is a sectional view showing the third embodiment of the present invention.
Figure 11:
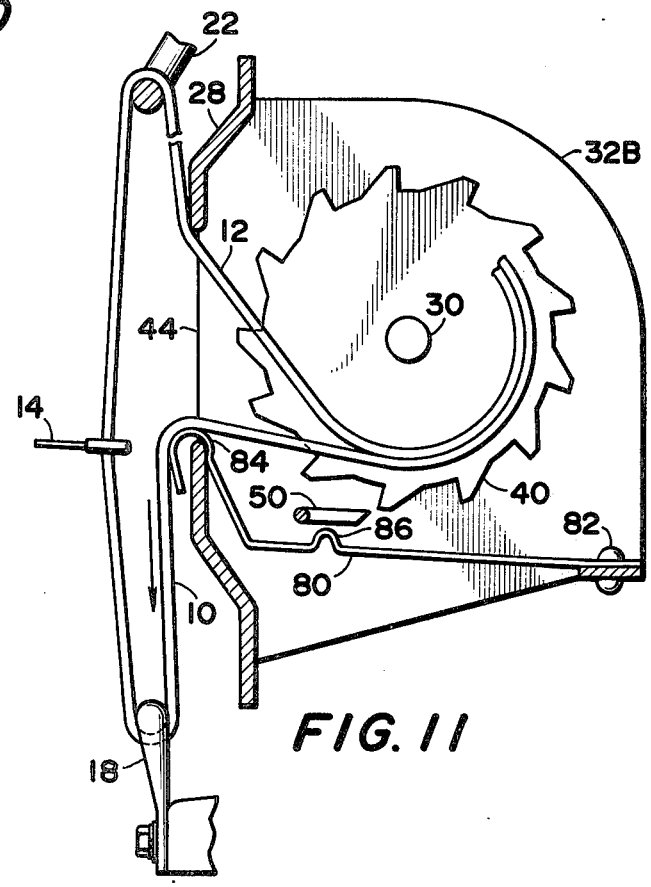
FIG. 11 is a sectional view showing the state where the tension is applied to the lap restraining webbing in FIG. 10.

Next, FIGS. 10 and 11 show a third embodiment of the present invention. The third embodiment shows another embodiment of tension detecting means. In the third embodiment, a lever 80 comprising a leaf spring is provided. Said lever 80 is secured at the base portion thereof to the frame 28 through a rivet 82, bent at the forward end thereof to be formed into a hook 84 to surround the edge portion of a rectangular window 44 formed in the frame 28, and formed at the central portion with a projection 86 abutting against the undersurface of the pawl 50.

Said lever 80 is designed such that the projection 86 thereof constantly urges up the pawl 50 to be inclined and engaged with the ratchet wheel 40, and is deformed by the hook 84 receiving the tension only when the tension of the unwound portion of the lap restraining webbing 10 wound over the shoulder webbing 12 is higher than a predetermined value, so that the projection 86 can be separated from the pawl 50. Consequently, only when the tension of the lap restraining webbing 10 is higher than a predetermined value, and the pawl 50 allows the restraining webbings to effect the wind-off rotation of the restraining webbings, prevents such a wind-off rotation that the tension is applied only to the shoulder restraining webbing 12, thus enabling to attain the effects similar to the case of the second embodiment.

Figure 12:
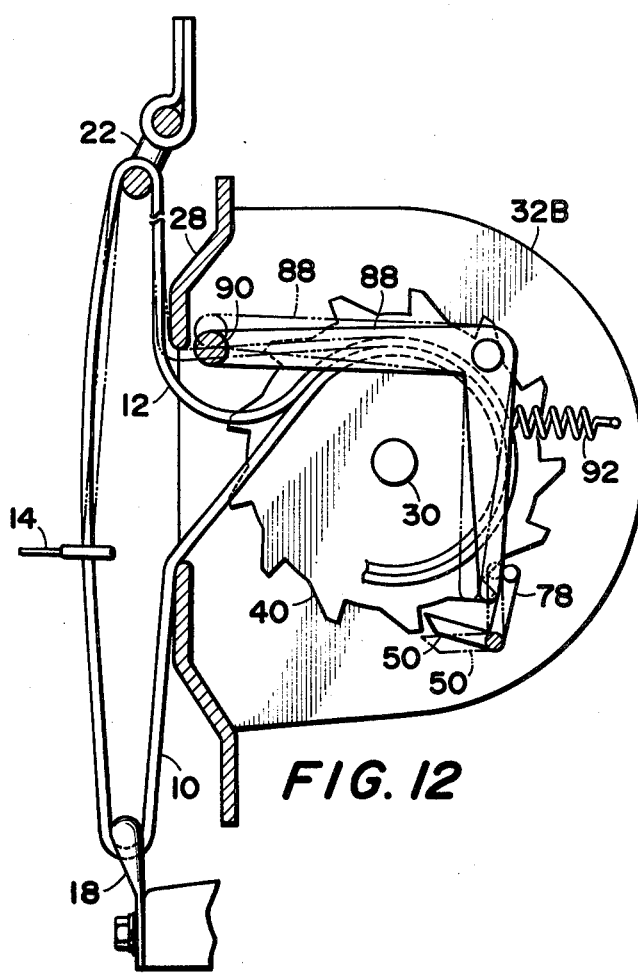
FIG. 12 is a sectional view showing the fourth embodiment of the present invention.

Next, FIG. 12 shows a fourth embodiment of the present invention, in which a substantially right-angled shaped rocking arm 88 is provided in place of the lever 80 in the third embodiment. Said rocking arm 88 is pivoted at the central portion thereof on the frame 28, abuts at one end thereof against the pawl 50 similarly to the case of said first embodiment, and is provided at the other end thereof with a detecting bar 90 which is projected in parallel to the take-up shaft 30 and adapted to abut against the shoulder restraining webbing 12. Additionally, a tensile coil spring 92 is spanned between said rocking arm 88 and the frame 28 so as to urge said rocking arm 88 in counter-clockwise direction, i.e., the direction of engaging the pawl 50 with the ratchet wheel 40.

Consequently, in the fourth embodiment, when the tension of the unwound portion of the shoulder restraining webbing 12 wound over the lap restraining webbing 10 is lower than a predetermined value, the rocking arm 88 causes the pawl 50 to engage with the ratchet wheel 40 to prevent the wind-off rotation of the ratchet wheel. When the tension of the shoulder restraining webbing 12 is higher than a predetermined value, the detecting bar 90 detects it and the rocking arm 88 takes the position shown by two-dotted chain lines, whereby the pawl 50 comes to be horizontal by its gravity to allow the wind-off rotation of the take-up shaft 30, so that the restraining webbing wound over the other restraining webbing as accompanied by the wind-off of the other restraining webbing wound inside can be prevented from being wound off and blocking up the interior of the retractor similar to the cases of the above embodiments.

Figure 13:
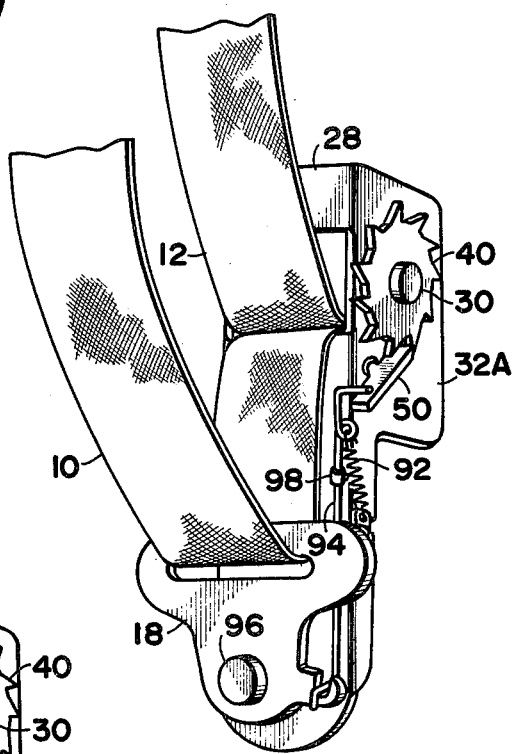
FIG. 13 is an oblique view showing the fifth embodiment of the present invention.
Figure 14:
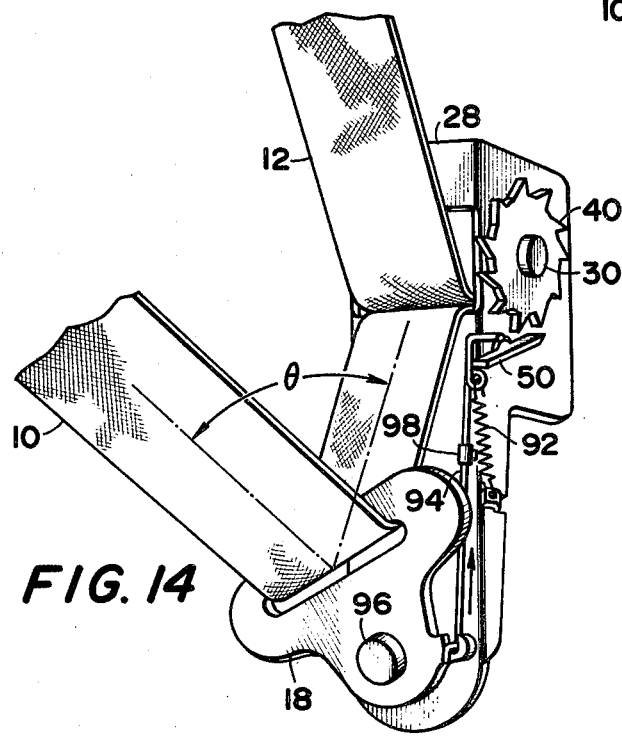
FIG. 14 is an oblique view showing the state where the tension is applied to the lap restraining webbing in FIG. 13.

Next, FIGS. 13 and 14 show a fifth embodiment, in which another embodiment of tension detecting means is illustrated similarly to the cases of the above embodiments.

In said fifth embodiment, the tension detecting means comprises a slip anchor 18 for folding back the leg restraining webbing 10, a push rod 94, a tensile coil spring 92 and a pawl 50.

Said slip anchor 18 is oscillatingly movable about a mounting bolt 96 thereof, and loosely coupled at one end thereof with the push rod 94. Said push rod 94 abuts at the other end against one portion of the pawl 50 and is urged by the tensile coil spring 92 in the direction of engaging the pawl 50 with the ratchet wheel 40.

As shown in FIG. 13, when the occupant does not put on the lap restraining webbing 10, the center lines of two portions of the lap restraining webbing 10 folded back at said slip anchor 18 are aligned with each other as viewed from the axial direction of the mounting bolt 96. As shown in FIG. 14, when the occupant puts on the lap restraining webbing 10, the center lines of two portions of the lap restraining webbing 10 folded back at said slip anchor 18 are not aligned with each other and make a predetermined angle $\theta$. Due to these facts, when said slip anchor 18 is oscillated around the mounting bolt 96, the push rod 94 is pushed up against the urging force of the tensile coil spring 92, separated from the pawl 50, and adapted to disengage the pawl 50 from the ratchet wheel 40. Additionally, in the drawings, reference numeral 98 indicates a guide for guiding the push rod 94 in the axial direction.

Since the fifth embodiment is arranged as above, if the tension is applied only to the shoulder restraining webbing 12 for winding out when the occupant puts on the restraining webbings or he wants to put on the same, then, since no tension is applied to the lap restraining webbing 10, the slip anchor 18 does not push up the push rod 94 and the pawl 50 prevents the wind-off rotation of the take-up shaft 30 as shown in FIG. 13. If the tension is applied to the lap restraining webbing 10 in addition to the shoulder restraining webbing 12, the slip anchor 18 allows the wind-off rotation of the take-up shaft 30 as shown in FIG. 14, with the result that the both restraining webbings are reliably wound off from the retractor without anyone of the restraining webbings being loosened in the retractor.

As has been described with reference to the embodiments, in the retractor for restaining webbings according to the present invention, when the tension of the unwound portion of at least one of the two restraining webbings wound round the take-up shaft one over the other is detected by the tension detecting means to be lower than a predetermined value, the wind-off rotation of the take-up shaft is prevented, and accordingly, such excellent effects are achieved that said one of the restraining webbings is not slackened and does not block up the interior of the retractor.

We claim:

1. A retractor for restraining webbings wherein two restraining webbings are wound round a single take-up shaft one over the other, characterized in that:
   tension detecting means is provided for detecting the tension on an unwound portion of at least one of said two restraining webbings; and
   an unwinding preventing means response to said tension detecting means such that when the tension of said one of the restraining webbings is lower than a predetermined value, said take-up shaft is prevented from rotating in an unwinding direction.

2. A retractor for restraining webbings as set forth in claim 1, characterized in that:
   said tension detecting means also detects the tension on the unwound portion of the other restraining webbing; and
   said unwinding preventing means prevents said take-up shaft from rotating in an unwinding direction when the tension on the unwound portion of one restraining webbing is lower than a predetermined value and that of the other restraining webbing is higher than a predetermined value.

3. A retractor for restraining webbings as set forth in claim 2, wherein said unwinding preventing means comprises a ratchet gear fixed to said take-up shaft and a pawl engagable with said ratchet gear and said tension detecting means comprises a first detecting arm abutting at one end thereof against the unwound portion of the other restraining webbing; and a rocking arm to which rotation of said detecting arm is transmitted when said detecting arm is rotated by the tension of the restraining webbing, said rocking arm causing said pawl to rotate so as to be engaged with said ratchet gear thereby preventing the take-up shaft from rotating in an unwinding direction.

4. A retractor for restraining webbings as set forth in claim 3, characterized in that:
   a resilient member is interposed between said detecting arm and said rocking arm for maintaining a predetermined angle between said detecting arm and said rocking arm.

5. A retractor for restraining webbing as set forth in claim 4, characterized in that:
   said tension detecting means is provided with a second detecting arm for detecting the tension of said one restraining webbing and said second detecting arm, irrespective of the rotation of said first detecting arm, holding said rocking arm such that said pawl is disengaged from the ratchet gear when said second detecting arm is rotated by the tension of said one restraining webbing.

6. A retractor for restraining webbings as set forth in claim 5, characterized in that said two restraining webbings are, upon being wound off from the take-up shaft, bifurcated to be wound round slip anchors disposed in the directions opposite to each other.

7. A retractor for restraining webbings as set forth in claim 3, characterized in that said pawl is also moved by a sensor operable in an emergency of a vehicle so as to be engaged with said ratchet gear.

8. A retractor for restraining webbings s set forth in claim 1, wherein said unwinding preventing means comprises a ratchet gear fixed to said take-up shaft and a pawl engagable with said ratchet gear and said tension detecting means includes a lever abutting at one end against the unwound portion of said one of the restraining webbings and at another portion against the pawl and said lever abuts the pawl and urges said pawl in a direction of being engaged with the ratchet gear and removes the urging against the pawl when the tension of the unwound portion of said one of the restraining webbings is increased.

9. A retractor for restraining webbings as set forth in claim 7, characterized in that said lever is made of a leaf spring.

10. A retractor for restraining webbings as set forth in claim 1, wherein said unwinding preventing means comprises a ratchet gear fixed to said take-up shaft and a pawl engagable with said ratchet gear and said tension detecting means includes a rocking arm abutting at one end against the unwound portion of said one of the restraining webbings, and being in contact at another portion with the pawl and a biasing means, said rocking arm being urged by said biasing means in a direction of engaging the pawl with the ratchet gear, and said engagement is removed when the tension of the remaining wound-up portion of said one restraining webbing is higher than a predetermined value.

11. A retractor for restraining webbings as set forth in claim 1, wherein said unwinding preventing means comprises a ratchet gear fixed to said take-up shaft and a pawl engagable with said ratchet gear and said tension detecting means includes a slip anchor around which the unwound portion of said one of the restraining webbings is guided, means mounting said slip anchor for rotation when the tension of said unwound portion reaches a predetermined value and said slip anchor is coupled to said pawl such that when said slip anchor rotates said pawl is disengaged from the ratchet gear thereby enabling said take-up shaft to rotate in an unwinding direction.

12. A retractor for restraining webbings as set forth in claim 11 further comprising a push rod coupling said slip anchor to said pawl.

13. A retractor for restraining webbings as set forth in claim 12, further comprising means for urging said push rod in the direction of engaging said pawl with the ratchet gear.

* * * * *